US009228920B2

(12) United States Patent
Blonde et al.

(10) Patent No.: US 9,228,920 B2
(45) Date of Patent: Jan. 5, 2016

(54) METHOD AND DEVICE FOR ESTIMATING THE OPTICAL POWER OF CORRECTIVE LENSES IN A PAIR OF EYEGLASSES WORN BY A SPECTATOR

(71) Applicant: THOMSON LICENSING, Issy de Moulineaux (FR)

(72) Inventors: Laurent Blonde, Thorigne-Fouillard (FR); Sylvain Thiebaud, Noyal sur Vilaine (FR); Didier Doyen, La Bouexiere (FR)

(73) Assignee: Thomson Licensing (FR)

( * ) Notice: Subject to any disclaimer, the term of this patent is extended or adjusted under 35 U.S.C. 154(b) by 122 days.

(21) Appl. No.: 13/692,140

(22) Filed: Dec. 3, 2012

(65) Prior Publication Data

US 2013/0155393 A1    Jun. 20, 2013

(30) Foreign Application Priority Data

Dec. 19, 2011   (FR) ...................... 11 61913

(51) Int. Cl.
*G01B 9/00* (2006.01)
*G01M 11/02* (2006.01)
*G06K 9/00* (2006.01)

(52) U.S. Cl.
CPC ......... *G01M 11/0228* (2013.01); *G06K 9/0061* (2013.01)

(58) Field of Classification Search
CPC ............ G01M 11/02; G01M 11/0228; G01M 11/0235; G01M 11/00; G01M 11/0207; G01M 11/0214; G01B 9/00
USPC .......................................... 356/125, 124, 127
See application file for complete search history.

(56) References Cited

U.S. PATENT DOCUMENTS

| 1,803,473 | A |   | 5/1931  | Johnston et al. |          |
|-----------|---|---|---------|-----------------|----------|
| 4,123,163 | A | * | 10/1978 | Chace et al.    | 356/125  |
| 4,203,666 | A |   | 5/1980  | Akaba et al.    |          |

(Continued)

FOREIGN PATENT DOCUMENTS

| EP | 1818662 | 8/2007 |
| FR | 731102  | 8/1932 |

(Continued)

OTHER PUBLICATIONS

The French Search Report dated Aug. 31, 2012.

*Primary Examiner* — Tarifur Chowdhury
*Assistant Examiner* — Isiaka Akanbi
(74) *Attorney, Agent, or Firm* — Jack Schwartz & Associates, PLLC

(57) ABSTRACT

This invention relates to a method for estimating the optical power of corrective lenses in a pair a eyeglasses worn by a spectator, characterized in that it comprises the following steps:
  acquire two consecutive images of this spectator's face located in front of a means for acquiring these two images, one of these images being acquired with eyeglasses and the other without,
  calibrate one of the two acquired images with respect to the other,
  identify the position of the iris of each eye in each image,
  evaluate the size magnification or size reduction of each imaged iris, and
  estimate the optical power of the corrective lenses based on the evaluated magnification or reduction.

7 Claims, 2 Drawing Sheets

(56) References Cited

U.S. PATENT DOCUMENTS

| | | | |
|---|---|---|---|
| 4,741,617 A * | 5/1988 | Strittmatter | 356/124 |
| 5,220,361 A * | 6/1993 | Lehmer | A61B 3/113 |
| | | | 351/210 |
| 6,286,957 B1 | 9/2001 | Livnat | |
| 7,370,970 B2 * | 5/2008 | Hammoud et al. | 351/222 |
| 7,771,053 B2 * | 8/2010 | Polland et al. | 351/246 |
| 2001/0026351 A1 * | 10/2001 | Gao et al. | 351/227 |
| 2002/0039433 A1 * | 4/2002 | Shin | 382/117 |
| 2002/0093515 A1 * | 7/2002 | Fay et al. | 345/629 |
| 2007/0036397 A1 * | 2/2007 | Hamza | 382/117 |
| 2008/0044063 A1 * | 2/2008 | Friedman | A61B 3/1216 |
| | | | 382/117 |
| 2008/0088795 A1 * | 4/2008 | Goldstein | A61B 3/117 |
| | | | 351/206 |
| 2009/0015787 A1 * | 1/2009 | Guillen et al. | 351/205 |
| 2010/0110374 A1 * | 5/2010 | Raguin et al. | 351/206 |
| 2011/0116041 A1 * | 5/2011 | Hartung | A61B 3/10 |
| | | | 351/206 |
| 2011/0299034 A1 * | 12/2011 | Walsh | A61B 3/102 |
| | | | 351/206 |

FOREIGN PATENT DOCUMENTS

| | | |
|---|---|---|
| JP | 2001178679 | 7/2001 |
| KR | 1020050094222 | 7/2005 |

* cited by examiner

METHOD AND DEVICE FOR ESTIMATING THE OPTICAL POWER OF CORRECTIVE LENSES IN A PAIR OF EYEGLASSES WORN BY A SPECTATOR

This application claims the benefit, under 35 U.S.C. §119 of FR Patent Application 1161913, filed 19 Dec. 2011.

BACKGROUND

This invention relates to a method for estimating the optical power of corrective lenses in a pair of eyeglasses worn by a spectator.

The invention is situated in the domain of viewing media streams on screens. In this domain, it may be necessary to adjust the processing of media streams viewed on these screens according to data regarding the optical power of corrective lenses in a pair of eyeglasses worn by a spectator. One may thus, for example, adjust the depth-of-field effect of streams viewed on a 3D screen with a corrected spectator view so that the spectator is not disturbed when viewing the media stream.

The problem solved by this invention is to obtain the optical power of corrective lenses in a pair of eyeglasses worn by a spectator and thus to be able to adjust the processing of media streams to be viewed on screens.

A first approach for obtaining data regarding this optical power is to ask the spectator to provide, by means of a user interface, actual and specific data defined by a healthcare professional, such as an ophthalmologist, an optometrist, or an eyeglasses provider. However, knowing and entering this data is impractical because such data is most often unavailable to the spectator when the spectator wishes to view a media stream on a screen. Additionally, this data is expressed in different units of measure, depending on the country, without there necessarily being any correspondences between them, making it difficult to use this data to adjust the processing to be applied to media streams to be viewed.

Another approach is to physically measure the optical power of the lenses with, for example, a lensometer. However, such measurements cannot be widely deployed due to their cost and are therefore reserved for professionals.

According to this invention and in general, the optical power of corrective lenses in a pair of eyeglasses worn by a spectator is estimated from two images of the spectator's face, taken by a camera located in front of the spectator, who is positioned to view a media stream on a screen.

SUMMARY

According to one of its aspects, this invention relates to a method for estimating the optical power of corrective lenses in a pair of eyeglasses worn by a spectator. This method is characterized in that it comprises the following steps:
  acquire two consecutive images of this spectator's face located in front of the means for acquiring these two images, one of these images being acquired with eyeglasses and the other without,
  calibrate one of the two acquired images with respect to the other,
  identify the position of the iris of each eye in each image,
  evaluate the magnification or size reduction of each imaged iris, and
  estimate the optical power of the corrective lenses based on the evaluated magnification or reduction.

This method is quick and can easily be used by a spectator compared to the other methods of the prior art.

The invention also relates to a computer program, which can be stored on a medium and/or downloaded from a communication network. This computer program includes instructions for implementing the aforementioned method, when said program is executed by the computer system or processor. The invention also relates to means for storage, including such a computer program.

According to another of its aspects, this invention also relates to a device comprising means for implementing the above method.

BRIEF DESCRIPTION OF THE DRAWINGS

The characteristics of the aforementioned invention, as well as others, will emerge more clearly upon reading the following description of a particular embodiment, said description being made with reference to the drawings attached, wherein.

DETAILED DESCRIPTION OF PREFERRED EMBODIMENTS

This invention applies to farsighted or nearsighted spectators. In the case of farsightedness, the corrective lenses are converging lenses and increase the size of the eyes when observing the spectator from the front. For nearsightedness, the corrective lenses are diverging lenses, and the eyes appear smaller with the eyeglasses than without.

Figure 2:
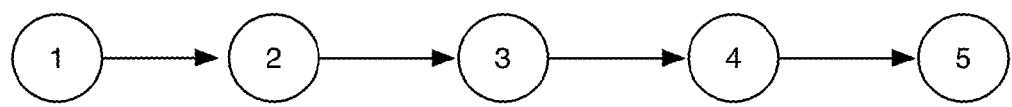
FIG. 2. schematically shows a diagram of the steps of the method for estimating the optical power of lenses in a pair of eyeglasses worn by a user.

The method of estimating the optical power of corrective lenses in a pair of eyeglasses worn by a spectator, as shown in FIG. 2, is characterized in that it comprises a step 1 for acquiring two consecutive images Ia and Is of this spectator's face locating in front of a means for acquiring these two images. One of these images, Ia, is acquired when the spectator is wearing eyeglasses, while the other of these images, Is, is acquired when the spectator is not wearing eyeglasses.

Figure 1:
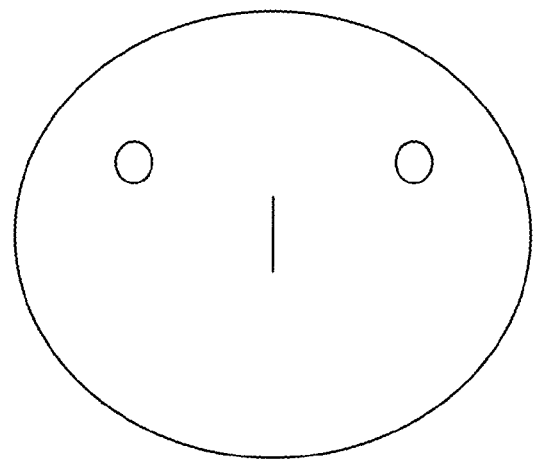
FIG. 1 schematically shows an example of markings displayed on a screen to facilitate the positioning of the spectator's face.

In practice, the means of acquisition, such as a camera, can be mounted on or integrated in a viewing device, such as a screen intended for viewing a media stream. It can also be mounted on a video signal receiving and decoding device, such as a device described as a "set top box" or STB. The spectator is then asked to stand in front of the camera in a particular position. For this purpose, as illustrated in FIG. 1, markings for the eye, nose, and outline of the face may be displayed on the screen such that they overlap the image of the spectator's face viewed by the camera. Using the camera for a mirror effect facilitates the positioning of the spectator. The spectator is positioned so that his eyes, nose, and face line up with these markings as well as possible. Setting the camera's zoom can also help adjust the spectator's eyes, nose, and face properly.

Based on cameras that are commonly used in multimedia systems, this initial positioning of the spectator allows for a sufficient acquisition resolution of the two images to determine the radii of the eyes as we will see later.

The method continues with a step 2 for calibrating one of the two images, such as Ia, relative to the other, such as Is, followed by a step 3 for identifying the position of the iris of each eye in each image, a step 4 for evaluating the magnification or size reduction of each imaged iris due to the corrective lenses, and a step 5 for estimating the optical power of the corrective lenses.

It is preferable that the distance between the spectator's face and the means of acquisition, such as the camera, remains constant during the acquisition of the two images. However, if this is not the case, a scale factor S is, preferably, calculated from one face relative to another by extracting and mapping image primitives located outside of image regions relative to the corrective lenses.

According to an embodiment of the method, the scale factor S is given by $$S = \frac{D_a}{D_s},$$

where $D_s$ is a distance expressed in pixels between two primitive points in the image Is, then taken then as a reference, and $D_a$ is a distance expressed in pixels between the same two primitive points in the image Ia.

Regarding the identification of the position of an iris in an image, it is known to use, for example, the specific texture of the region that corresponds to the iris.

According to an embodiment of such identification, in a window positioned around a selected position, such as the center of one of the markings viewed on the 3D screen, the edge of the iris of an eye in an image is detected by applying an edge detector, such as, for example, the Canny edge detector. Then, a Hough transform is used to detect a circle and thus determine the radius, expressed in pixels, of the circle. Applied for identifying the iris of each eye in each image, this approach makes it possible to determine the radii $r_L^a$ of the irises of the left eye and the radii $r_R^a$ of the irises of the right eye, both of the image Ia when the spectators is wearing eye glasses, and the radii $r_L^s$ of the irises of the right eye, the radii $r_R^s$ of the irises of the left eye, both of the image Is when the spectators is not wearing eye glasses.

The combined use of a Canny edge detector and the Hough transform provides subpixel accuracy for estimating the radii of the irises.

Factors $$K_L = \frac{1}{S} \cdot \frac{r_L^a}{r_L^s}$$

and $$K_R = \frac{1}{S} \cdot \frac{r_R^a}{r_R^s}$$

are then calculated in order to evaluate the magnification or size reduction of the iris for the right eye $K_R$ or left eye $K_L$ considering, for example, the image Is as the reference image. It should be noted that the scale factor S is only optional.

The optical power $P_L$ of the left lens of the corrective eyeglasses is then given by the inverse of the focal length of the lens $f'_L$ estimated from the factor $K_L$ and the optical power $P_R$ of the right lens of the corrective eyeglasses is given by the inverse of the focal length of the lens $f'_R$ and then estimated from the factor $K_R$.

For this purpose, the distance e between the lens and the iris of one eye of the spectator must be known or estimated. The average of 14 mm is used by optometrists as an estimated value. Considering the Gaussian paraxial approximation, it is seen that a lens focal length f'=OF' can be calculated from the apparent change in size of the radii of irises $K_L$ and $K_R$.

Figure 3:
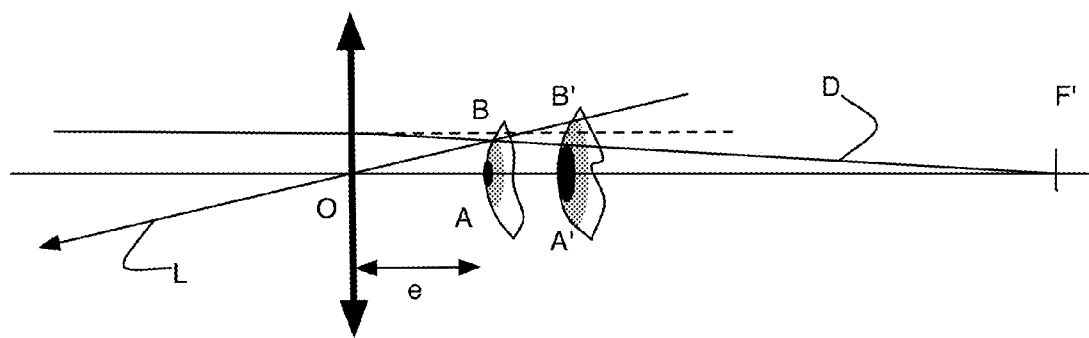
FIG. 3 schematically shows an example of estimating the optical power of a corrective lens in a pair of eyeglasses according to one embodiment of the method of FIG. 2.

In FIG. 3, F' is the focal point, the line L is the radius passing through the optical center O (not deflected by the correction of the lens), the line D is the radius from the focal point F', which is deflected from the optical axis by the correction of the lens, Ox is the optical axis of the lenses, the points B and B' are the intersection between the line L and the iris of the eye (shaded in FIG. 2), and the points A and A' are the intersection of the iris with the optical axis Ox in the images Ia and Is.

Therefore, if AB is the radius of the iris of the eye without corrective eyeglasses, and A'B' is the radius of the imaged iris of the eye through the glasses, then the value of $K_L$ or $K_R$ is given by $K_{L\ or\ R}$=A'B'/AB. This value corresponds to the magnification M of the eyeglass lenses for the position OA. This value M can also be expressed as:

M=A'B'/AB=OA'/OA

If the distance e is OA, we get OA'=$K_{L\ or\ R}$·e.

Inserting these values into the conjugation formula originating at the center of said Descartes formula, which is $$\frac{1}{OA'} - \frac{1}{OA} = \frac{1}{f'},$$

provides the focal length $f_L'$ by $$f_L' = \frac{k_L \cdot e}{1 - k_L},$$

where OA=e and OA'=$K_L$·e

The focal length fR' is similarly given by replacing the factor $K_L$ with the factor $K_R$ considering from this FIG. 3.

In some applications, it is not necessary to know the focal length f', but it is sufficient to know the magnification value M.

This is the case when there is a need to determine the deflection of a ray of light from an original angular direction $\theta_A$, defined from an observation point, toward a perceived angular direction $\theta_{A'}$ after eyeglass lenses have been used.

In this case, $$\theta_{A'} = a\tan\frac{OA \cdot \theta_A}{OA'} = a\tan\frac{\tan\theta_A}{M} = a\tan\frac{\tan\theta_A}{k}$$

And the error on the estimated distance e then has no influence.

Figure 4:
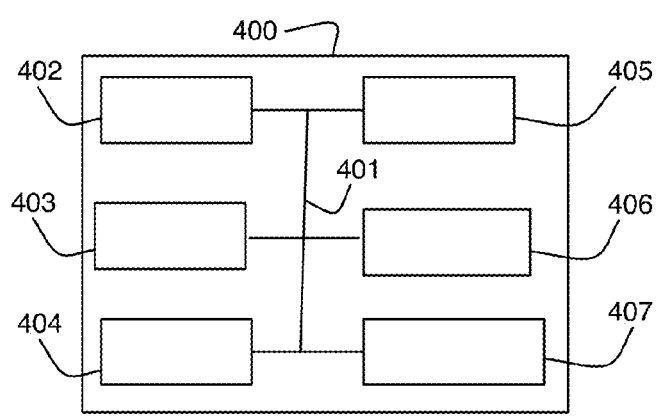
FIG. 4 schematically shows a block diagram of an embodiment of a device implementing the method of FIG. 2.

FIG. 4 schematically illustrates an embodiment of the architecture of a device implementing the method of FIG. 2.

The device 400 comprises the following, connected by a communication bus 401:
- a processor, micro-processor, microcontroller (noted μc), or CPU (Central Processing Unit) 402;
- random access memory 403;
- read-only memory 404;
- means for acquiring an image of a spectator's face, such as a camera 405;
- a screen 406; and
- means of a man-machine interface 407, such as a touchscreen and/or a set of buttons.

The microcontroller 402 is capable of executing instructions loaded into the random access memory 403 from the read-only memory 404, from external memory (not shown), from a storage medium such as an SD card or other medium, or from a communication network. When the device 400 is switched on, the microcontroller 402 is capable of reading instructions from the random-access memory 403 and executing them. These instructions form a computer program that causes the implementation, by the microcontroller 402, of some or all of the algorithms described below with respect to FIG. 2.

Some or all of the algorithms described below with respect to FIG. 2 may be implemented via software by executing a set of instructions on a programmable machine, such as a DSP (digital signal processor) or a microcontroller, such as the microcontroller 402, or implemented via hardware by a machine or dedicated component, such as an FPGA (field-programmable gate array) or an ASIC (application-specific integrated circuit).

The means 407 may be used to allow the user to interact with the device, such as to change the camera's zoom. The means 402, 403, and 404 coexist to provide the roles of means for identifying the position of the iris of each eye in each image, evaluating the magnification or size reduction of each imaged iris, and estimating the optical power of corrective lenses from the thus evaluated magnification or reduction.

The invention claimed is:

1. A method for estimating optical power of corrective lenses in a pair of eyeglasses worn by a spectator, the method comprising:
   identifying a position of an iris of each eye of a spectator in first and second consecutive images of the spectator's face, the first consecutive image being acquired with the pair of eyeglasses in front of the eyes, and the second consecutive image being acquired without the pair of eyeglasses in front of the eyes,
   comparing a size of each imaged iris in the first consecutive image with a size of each imaged iris in the second consecutive image;
   determining the optical power of the corrective lenses in the pair of eyeglasses based on the comparison and an evaluated size magnification or size reduction between each imaged iris of the first and second consecutive images.

2. The method according to claim 1, wherein the identification of the iris of each eye in each image comprises:
   in a window positioned around a selected position, the edge of the iris is detected in the image by applying an edge detector to the image, and a Hough transform is used to determine a radii of circles defining each iris of each image,
   the size magnification or size reduction of each imaged iris is then estimated by a ratio between the radii of two circles in the images corresponding to the iris, and
   the optical power of the lens in a pair of corrective eyeglasses with respect to the iris is given by the inverse of the focal length of the lens then estimated from the ratio between the radii of the two circles and the distance between the lens and the iris.

3. The method according to claim 1, wherein the magnification or size reduction of an imaged iris is weighted by a scale factor defined by a ratio between a distance between two primitive points on one of the two consecutive images and a distance between the same two primitive points of the other image.

4. The method according to claim 1 further comprising adjusting the processing applied to a media stream intended to be viewed by the spectator on a 3D screen.

5. A device for estimating the optical power of corrective lenses in a pair of eyeglasses worn by a spectator, the device comprising:
   a processor configured to identify a position of an iris of each eye in first and second consecutive images of the spectator's face, the first consecutive image being acquired with eyeglasses positioned in front of the eyes and the second consecutive image being acquired without eyeglasses positioned in front of the eyes, and
   determine the optical power of the corrective lenses in the pair of eyeglasses based on an evaluated size magnification or size reduction between each respective iris in the first and second consecutive images.

6. The device according to claim 5, wherein the second hardware component identifies the iris of each eye in each image by
   in a window positioned around a selected position, the edge of the iris is detected in the image by applying an edge detector to the image, and a Hough transform is used to determine a radii of circles defining each iris of each image,
   the size magnification or size reduction of each imaged iris is then estimated by a ratio between the radii of two circles in the images corresponding to the iris, and
   the optical power of the lens in a pair of corrective eyeglasses with respect to the iris is given by the inverse of the focal length of the lens then estimated from the ratio between the radii of the two circles and the distance between the lens and the iris.

7. The device according to claim 5, wherein the second hardware component weights the magnification or size reduction of an imaged iris by a scale factor defined by a ratio between a distance between two primitive points on one of the two consecutive images and a distance between the same two primitive points of the other image.

* * * * *